United States Patent
Maher et al.

[11] Patent Number: 6,043,174
[45] Date of Patent: Mar. 28, 2000

[54] HIGH DIELECTRIC CONSTANT X7R CERAMIC CAPACITOR, AND POWDER FOR MAKING

[75] Inventors: Galeb H. Maher, North Adams, Mass.; Veerabhadrarao Bheemineni, Latham, N.Y.

[73] Assignee: MRA Laboratories, North Adams, Mass.

[21] Appl. No.: 08/883,212

[22] Filed: Jun. 26, 1997

[51] Int. Cl.[7] .................................................. C04B 35/46
[52] U.S. Cl. ....................... 501/137; 501/139; 361/321.4
[58] Field of Search .................... 501/137, 139; 361/321.4

[56] References Cited

U.S. PATENT DOCUMENTS

| | | | |
|---|---|---|---|
| 4,266,265 | 5/1981 | Maher | 361/321 |
| 4,706,163 | 11/1987 | Maher | 361/321 |
| 4,882,651 | 11/1989 | Maher | 361/321 |
| 5,010,443 | 4/1991 | Maher | 361/321 |
| 5,258,338 | 11/1993 | Maher | 501/137 |
| 5,672,378 | 9/1997 | Maher et al. | 501/137 |

OTHER PUBLICATIONS

Compensating Defects in Highly-Doped $BaTiO_3$, Helen M. Chan et al, pp. 507–510, Journal of American Ceramic Society, vol. 69, No. 6; 1986.

Calcium as an Acceptor Impurity in $BaTiO_3$, Young Ho Han et al, pp. 96–103, Journal of American Ceramic Society, vol. 70, No. 2; 1987.

*Primary Examiner*—Deborah Jones

[57] ABSTRACT

Multilayer capacitors with have been made including a cadmium silicate flux by firing in a closed crucible at about 1100° C. to provide a high K and smooth X7R coefficient of K with temperature, but tend to acquire a low insulation resistance in a high temperature life test under voltage. This problem was solved heretofore by the added step of a post-sinter anneal. However, the anneal step adds cost and further complexity to the manufacturing process. Through a number of experiments it has been discovered that by the addition of a very small and critical quantity of a calcium compound such as calcium carbonate or calcium niobate to the start ceramic powder that the unwanted anneal step may be eliminated while maintaining a high insulation resistance in an accelerated life test and with only a very small reduction of dielectric constant or smoothness with temperature

12 Claims, 10 Drawing Sheets

FIGURE 2

| Example | 1 | 2 | 3 |
|---|---|---|---|
| Sinter Temp. C | 1090 | 1110 | 1130 |
| Density gm/cc | 5.77 | 5.84 | 5.88 |
| Ave.Cap nF | 39.2 | 40.1 | 38.3 |
| %DF | 1.32 | 1.38 | 1.37 |
| K | 3419 | 3494 | 3337 |
| Life Test Fail@24hr | 0/18 | 18/18 | 18/18 |
| Life Test Fail@ end | 0/18 | 18/18 | 18/18 |
| Duration of Test | 159 | 1 | 1 |
| TCC @ -55 C | 0.1 | 1.2 | 1.8 |
| TCC @ 105 C | -4.9 | -6.6 | -7.5 |
| TCC @ 125 C | 3.9 | 1.4 | 0.0 |
| Anneal temp. C | 1070 | 1070 | 1070 |
| Density gm/cc | 5.82 | 5.88 | 5.89 |
| Ave.Cap nF | 42.9 | 46.5 | 46.2 |
| %DF | 1.49 | 1.56 | 1.6 |
| K | 3780 | 4050 | 4030 |
| Life Test Fail@24hr | 1/18 | 0/18 | 2/18 |
| Life Test Fail@ end | 1/18 | 0/18 | 2/18 |
| Duration of Life Test (hrs) | 94.5 | 94.5 | 94.5 |
| TCC @ -55 C | 2.4 | 2.6 | 3.3 |
| TCC @ 105 C | -6.9 | -7.0 | -7.0 |
| TCC @ 125 C | -0.3 | -1.0 | -0.3 |

FIGURE 3

| Example | 4 | 5 |
|---|---|---|
| Mole% Nb2O5 | 0.70 | 0.00 |
| Mole% Ta2O5 | 0.42 | 1.06 |
| Sinter Temp. C | 1130 | 1130 |
| Density gm/cc | N.A. | N.A. |
| Ave.Cap nF | 66.9 | 67.3 |
| %DF | 1.52 | 1.48 |
| K | 3810 | 3747 |
| Life Test Fail@24hr | 18/18 | 18/18 |
| Life Test Fail@ end | 18/18 | 18/18 |
| Duration of Test | 1 | 1 |
| TCC @ -55 C | 0.8 | -1.9 |
| TCC @ 105 C | -5.3 | -4.0 |
| TCC @ 125 C | 2.6 | 4.1 |
| Anneal temp. C | 1080 | 1080 |
| Density gm/cc | 5.87 | 5.82 |
| Ave.Cap nF | 71.6 | 71.5 |
| %DF | 1.68 | 1.68 |
| K | 4077 | 3983 |
| Life Test Fail@24hr | 0/17 | 0/18 |
| Life Test Fail@ end | 0/17 | 0/18 |
| Duration of Life Test (hrs) | 166 | 166 |
| TCC @ -55 C | 2.7 | 1.0 |
| TCC @ 105 C | -8.9 | -6.7 |
| TCC @ 125 C | -1.4 | 1.0 |

FIGURE 4

| Example | 6 | 7 |
|---|---|---|
| Electrode Metal | 60Au/20Pt/20Pd | 70Ag/30Pd |
| Sinter Temp. C | 1110 | 1110 |
| Density gm/cc | 5.67 | 5.84 |
| Ave.Cap nF | 62.8 | 40.1 |
| %DF | 1.66 | 1.38 |
| K | 3220 | 3494 |
| Life Test Fail@24hr | 23/24 | 18/18 |
| Life Test Fail@ end | 23/24 | 18/18 |
| Duration of Test | 48 | 1 |
| TCC @ -55 C | -3.5 | 1.2 |
| TCC @ 105 C |  | -6.6 |
| TCC @ 125 C | 8.0 | 1.4 |
| Anneal temp. C | 1100 | 1070 |
| Density gm/cc | N.A. | 5.88 |
| Ave.Cap nF | 61.7 | 46.5 |
| %DF | 1.61 | 1.56 |
| K | 3168 | 4050 |
| Life Test Fail@24hr | 1/23 | 0/18 |
| Life Test Fail@ end | 1/23 | 0/18 |
| Duration of Life Test | 48 | 94.5 |
| TCC @ -55 C | -2.9 | 2.6 |
| TCC @ 105 C | -6.0 | -7.0 |
| TCC @ 125 C | 3.5 | -1.0 |

FIGURE 5

| Example | 8 | 9 |
|---|---|---|
| Variant | BaTiO3 | BaTiO3 |
| Sinter Temp. C | 1135 | 1135 |
| Density gm/cc | N.A. | 5.85 |
| Ave.Cap nF | 142.0 | 89.0 |
| %DF | 2.66 | 3.10 |
| K | 4056 | 2790 |
| Life Test Fail@24 | 13/18 | 3/18 |
| Life Test Fail@ en | 13/18 | 3/18 |
| Duration of Test | 142 | 142 |
| TCC @ -55 C | -5.5 | -14.2 |
| TCC @ 105 C | -9.1 | -1.8 |
| TCC @ 125 C | -4.3 | -1.0 |
| Anneal temp. C | 1080 | 1080 |
| Density gm/cc | N.A. | N.A. |
| Ave.Cap nF | 157.2 | 99.1 |
| %DF | 3.04 | 3.56 |
| K | 4491 | 3108 |
| Life Test Fail@24 | 4/17 | 1/18 |
| Life Test Fail@ en | 4/17 | 1/18 |
| Duration of Life Te | 136 | 136 |
| TCC @ -55 C | -7.9 | -15.6 |
| TCC @ 105 C | -9.2 | -1.9 |
| TCC @ 125 C | -5.3 | -1.9 |

FIGURE 6

| Example | 10 | 11 | 12 | 13 |
|---|---|---|---|---|
| Dopant | TiO2 | TiO2 | TiO2 | TiO2 |
| Mole% Dopant | 0.88 | 0.88 | 0.88 | 0.58 |
| Sinter Temp. C | 1110 | 1110 | 1130 | 1100 |
| Density | 5.84 | 5.84 | 5.78 | N.A. |
| Ave.Cap nF | 92.8 | 92.8 | 89.0 | 88.7 |
| %DF | 1.64 | 1.64 | 1.72 | 1.89 |
| K | 4368 | 4368 | 4187 | 3730 |
| Life Test @24hr | 0/18 | 0/18 | 18/18 | 3/17 |
| Life Test @ end | 2/18 | 2/18 | 18/18 | 7/17 |
| Duration of Test | 161 | 161 | 24 | 166 |
| TCC @ -55 | -1.4 | -1.4 | -1.0 | 1.9 |
| TCC @ 105 | -10.3 | -10.3 | -9.6 | -7.0 |
| TCC @ 125 | -4.7 | -4.7 | -4.0 | -0.8 |
| Anneal temp | 1075 | 1027 | 1075 | 1077 |
| Density | 5.81 | N.A. | N.A. | 5.85 |
| Ave.Cap nF | 99.9 | 96.1 | 103.8 | 89.0 |
| %DF | 1.87 | 1.82 | 2.07 | 1.83 |
| K | 4700 | 4519 | 4885 | 3740 |
| Life Test @24hr | 2/18 | 1/16 | 1/17 | 6/35 |
| Life Test @ end | 2/18 | 1/16 | 1/17 | 7/35 |
| Duration of Test | 67 | 110 | 95 | 240 |
| TCC @ -55 | -3.6 | -1.8 | -4.6 | 3.5 |
| TCC @ 105 | -11.5 | -10.1 | -10.8 | -7.2 |
| TCC @ 125 | -6.4 | -3.7 | -5.5 | -0.6 |

FIGURE 7

| Example | 14 | 15 | 16 | 17 | 18 | 19 | 20 | 21 | 22 | 23 | 24 | 25 |
|---|---|---|---|---|---|---|---|---|---|---|---|---|
| Dopant | Y2O3 | Y2O3 | Y2O3 | Y2O3 | Er2O3 | Er2O3 | Yb2O3 | Yb2O3 | Dy2O3 | Dy2O3 | Gd2O3 | Gd2O3 |
| Mole% Dopant | 0.21 | 0.21 | 0.36 | 0.36 | 0.29 | 0.29 | 0.28 | 0.28 | 0.29 | 0.29 | 0.29 | 0.29 |
| Sinter Temp. C | 1110 | 1130 | 1110 | 1125 | 1113 | 1133 | 1105 | 1130 | 1110 | 1125 | 1110 | 1125 |
| Density gm/cc | 5.76 | 6.07 | 5.80 | 5.94 | N.A. | N.A. | N.A. | N.A. | N.A. | 5.98 | N.A. | 5.99 |
| Ave.Cap nF | 39.3 | 42.5 | 85.9 | 92.4 | 73.4 | 76.7 | 64.7 | 71.6 | 71.8 | 74.8 | 75.6 | 76.9 |
| %DF | 1.33 | 1.47 | 1.58 | 1.75 | 1.65 | 2.01 | 1.26 | 1.62 | 1.61 | 1.66 | 1.65 | 1.67 |
| K | 3691 | 3989 | 3799 | 4085 | 4128 | 4314 | 3810 | 4220 | 4453 | 4637 | 4401 | 4477 |
| Life Test Fail@24hr | 1/18 | 16/18 | 1/18 | 11/18 | 18/18 | 16/18 | 0/17 | 12/18 | 3/17 | 18/18 | 2/18 | 18/18 |
| Life Test Fail@ end | 3/18 | 16/18 | 2/18 | 17/18 | 18/18 | 16/18 | 0/17 | 17/18 | 3/17 | 18/18 | 3/18 | 18/18 |
| Duration of Test | 310 | 24 | 464 | 116 | 24 | 17.5 | 144 | 48 | 119 | 24 | 115 | 23 |
| TCC @ -55 | 1.3 | 1.9 | 2.5 | -0.0 | 2.8 | -2.0 | 1.5 | 1.1 | 2.6 | 1.4 | 3.5 | 3.4 |
| TCC @ 105 | -5.5 | -8.5 | -9.3 | -12.6 | -8.9 | -13.0 | -6.2 | -9.4 | -8.4 | -10.1 | -9.5 | -13.9 |
| TCC @ 125 | 2.3 | -1.8 | -3.2 | -7.7 | -2.0 | -8.1 | 1.6 | -3.1 | -0.5 | -7.2 | -2.3 | -6.9 |
| Anneal temp. C | 1070 | 1070 | 1065 | N.A. | 1080 | 1080 | 1076 | 1076 | 1080 | 1080 | 1080 | 1080 |
| Density gm/cc | N.A. | N.A. | N.A. | N.A. | 5.85 | 5.92 | 5.86 | 5.92 | 5.88 | N.A. | 5.92 | N.A. |
| Ave.Cap nF | 42.6 | 48.8 | 96.5 | N.A. | 79.3 | 88.5 | 72.8 | 75.0 | 72.8 | 83.1 | 76.6 | 81.7 |
| %DF | 1.51 | 1.77 | 1.97 | N.A. | 1.99 | 2.33 | 1.61 | 1.73 | 1.68 | 1.99 | 1.86 | 2.11 |
| K | 4004 | 4581 | 4266 | N.A. | 4460 | 4978 | 4293 | 4418 | 4515 | 5149 | 4460 | 4757 |
| Life Test Fail@24hr | 1/18 | 0/18 | 1/18 | N.A. | 12/18 | 6/18 | 0/18 | 0/18 | 0/17 | 0/17 | 1/17 | 0/18 |
| Life Test Fail@ end | 1/18 | 0/18 | 1/18 | N.A. | 12/18 | 6/18 | 0/18 | 0/18 | 0/17 | 0/17 | 1/17 | 0/18 |
| Duration of Life Test | 300 | 300 | 451 | N.A. | 72 | 102 | 72 | 72 | 117 | 117 | 115 | 114 |
| TCC @ -55 C | 2.0 | 2.4 | 2.3 | N.A. | 2.3 | -2.5 | 2.8 | -0.9 | 1.9 | 0.5 | 3.2 | 1.9 |
| TCC @ 105 C | -5.5 | -9.6 | -9.5 | N.A. | -9.5 | -14.7 | -6.6 | -12.3 | -3.4 | -12.6 | -9.9 | -13.8 |
| TCC @ 125 C | 2.2 | -2.7 | -3.3 | N.A. | -2.5 | -10.2 | 1.5 | -6.9 | 3.8 | -6.6 | -2.7 | -8.1 |

FIGURE 8

| Example | 26 | 27 | 28 | 29 | 30 | 31 | 32 | 33 | 34 | 35 | 36 | 37 |
|---|---|---|---|---|---|---|---|---|---|---|---|---|
| Dopant | CaCO3 | CaCO3 | CaCO3 | CaCO3 | CaCO3 | CaCO3 | CaCO3 | CaCO3 | CaCO3 | MgCO3 | MgCO3 | MgCO3 |
| Mole% Dopant | 0.44 | 0.44 | 0.44 | 0.52 | 0.52 | 0.52 | 0.65 | 0.65 | 0.65 | 0.44 | 0.44 | 0.44 |
| Sinter Temp. C | 1110 | 1130 | 1140 | 1130 | 1140 | 1150 | 1130 | 1140 | 1150 | 1130 | 1140 | 1150 |
| Density gm/cc | 5.88 | 5.95 | 5.94 | N.A. | 5.88 | N.A. | 5.85 | 5.92 | 5.87 | N.A. | 5.84 | N.A. |
| Ave.Cap nF | 64.1 | 70.9 | 69.3 | 71.9 | 68.0 | 65.4 | 68.3 | 69.5 | 69.2 | 68.9 | 74.8 | 74.2 |
| %DF | 1.47 | 1.38 | 1.53 | 1.53 | 1.6 | 1.29 | 1.52 | 1.52 | 1.53 | 1.51 | 1.73 | 1.38 |
| K | 3805 | 4206 | 4111 | 4275 | 4043 | 3889 | 3863 | 3931 | 3914 | 3750 | 4071 | 4038 |
| Life Test Fail@24hr | 1/16 | 0/18 | 13/18 | 0/17 | 0/18 | 6/18 | 0/17 | 0/17 | 0/17 | 0/18 | 0/18 | 2/18 |
| Life Test Fail@ end | 1/16 | 0/18 | 13/18 | 0/17 | 0/18 | 7/18 | 0/18 | 0/17 | 0/17 | 2/18 | 0/18 | 2/18 |
| Duration of Test | 290 | 71 | 291 | 307 | 286 | 213 | 1025 | 1012 | 1009 | 307 | 286 | 168 |
| TCC @ -55 C | 3.0 | 5.7 | 5.8 | 5.2 | 4.9 | 4.6 | 5.2 | 5.0 | 4.6 | 2.7 | 1.3 | 0.8 |
| TCC @ 105 C | -7.1 | -9.2 | -9.4 | -8.7 | -9.2 | -8.3 | -8.6 | -8.9 | -8.7 | -10.8 | -12.2 | -11.3 |
| TCC @ 125 C | 1.5 | -1.3 | -1.8 | -1.0 | -1.3 | -0.6 | -0.2 | -1.1 | -0.7 | -5.3 | -7.3 | -6.3 |
| Anneal temp. C | 1078 | 1078 | 1078 | 1080 | 1080 | 1080 | 1080 | 1080 | 1080 | 1080 | 1080 | 1080 |
| Density gm/cc | N.A. | N.A. | N.A. | 5.88 | 5.89 | 5.91 | 5.87 | 5.88 | 5.88 | 5.88 | 5.88 | 5.88 |
| Ave.Cap nF | 70.8 | 76.0 | 73.8 | 78.7 | 78.3 | 77.2 | 75.2 | 74.0 | 76.5 | 84.7 | 84.1 | 84.7 |
| %DF | 1.66 | 1.8 | 1.87 | 1.78 | 1.83 | 1.81 | 1.69 | 1.77 | 1.78 | 2.04 | 2.02 | 2.04 |
| K | 4200 | 4508 | 4378 | 4679 | 4656 | 4587 | 4253 | 4186 | 4326 | 4608 | 4576 | 4609 |
| Life Test Fail@24hr | 1/16 | 0/18 | 0/17 | 0/18 | 0/18 | 0/18 | 0/17 | 0/17 | 0/14 | 0/18 | 0/18 | 2/18 |
| Life Test Fail@ end | 1/16 | 0/18 | 0/17 | 0/18 | 0/18 | 0/18 | 0/17 | 0/17 | 0/14 | 0/18 | 0/18 | 2/18 |
| Duration of Life Test (hrs) | 498 | 498 | 362 | 65 | 65 | 192 | 640 | 640 | 827 | 116 | 116 | 192 |
| TCC @ -55 C | 3.5 | 4.0 | 3.8 | 3.8 | 3.7 | 3.0 | 3.4 | 3.6 | 3.5 | 2.8 | 0.4 | 0.5 |
| TCC @ 105 C | -7.0 | -10.7 | -10.6 | -11.2 | -11.5 | -10.5 | -10.0 | -10.4 | -10.2 | -14.5 | -15.1 | -15.5 |
| TCC @ 125 C | 1.7 | -3.4 | -3.6 | -3.8 | -4.8 | -3.4 | -1.5 | -2.8 | -2.3 | -10.0 | -11.1 | -11.5 |

FIGURE 9

| Example | 38 |
|---|---|
| Dopant | CaNb2O5 |
| Mole% Dopant | 0.65 |
| Sinter Temp. C | 1130 |
| Density gm/cc | 5.84 |
| Ave.Cap nF | 60.1 |
| %DF | 1.33 |
| K | 3433 |
| Life Test Fail@24hr | 0/18 |
| Life Test Fail@ end | 0/18 |
| Duration of Test | 150 |
| TCC @ -55 C | 3.1 |
| TCC @ 105 C | -6.0 |
| TCC @ 125 C | 2.8 |
| Anneal temp. C | 1075 |
| Density gm/cc | 5.83 |
| Ave.Cap nF | 60.1 |
| %DF | 1.46 |
| K | 3437 |
| Life Test Fail@24hr | 1/16 |
| Life Test Fail@ end | 1/16 |
| Duration of Life Test (hrs) | 125 |
| TCC @ -55 C | 3.5 |
| TCC @ 105 C | -7.2 |
| TCC @ 125 C | 1.1 |

HIGH DIELECTRIC CONSTANT X7R CERAMIC CAPACITOR, AND POWDER FOR MAKING

BACKGROUND

This invention relates to a ceramic powder compound from which there can be made a low-temperature sintered dielectric ceramic body of fine barium titanate grains and a small amount of cadmium silicate flux, the ceramic body having a high dielectric constant and a smooth temperature coefficient of dielectric constant, especially suitable of use in thin dielectric multilayer ceramic capacitors.

Dielectric ceramic compositions that, after sintering at about 1100° C., lead to mature dielectric bodies with smooth standard X7R performance and high dielectric constant are described in the patents to Galeb Maher, U.S. Pat. No. 5,358,338 issued Nov. 2, 1993 and U.S. Pat. No. 5,010,443 issued Apr. 23, 1991, which are assigned to the same assignee as is the present invention The first named of these patents employs a start powder having a simple composition that is essentially only a pure fine grain $BaTiO_3$, a small amount of a cadmium silicate flux and a yet smaller amount of a sintering inhibitor compound, e.g. a niobium oxide. About 0.1 weight percent $MnCO_3$ may be included. Multilayer bodies are formed of this powder and sintering is accomplished in a closed crucible at about 1100° C. The thus sintered multilayer bodies have exceptionally desirable dielectric properties with one exception; the insulation resistance at a high life test temperature of 125° C. and at a high voltage (about three times rated voltage, namely 150 volts) tends to drop below the limit of 100 megohm-microfarads.

It is shown in the patent that this problem is essentially solved by performing an additional step of annealing for an hour or two in an open atmosphere at a temperature a little lower than that at which sintering had been done.

A ceramic powder composition conforming to the teaching of the above noted patent U.S. Pat. No. 5,258,338 is designated herein as the composition of Example 1, corresponding to Table I. It has now been used in commercial quantities for several years by a number of manufacturers of multilayer ceramic capacitors.

In the manufacture of multilayer ceramic capacitors, this commercial powder is typically formed into an almost dry ceramic paste layer or tape that includes an organic binder. A thin film of 30% palladium and 70% silver electrodes are then screen printed on multiple pieces of the green ceramic tape which tape pieces are stacked to form a green ceramic stack structure or chip. After baking out the binder at about 400° C., the chips are then bisked to harden the chips by heating to about 800° C.

The chips are subsequently fired, i.e. sintered at from 1100° C. to 1120° C. in a closed crucible to cure the ceramic to a high density and to imbue the ceramic body with a high dielectric constant.

Sintering in a closed crucible is necessary for creating an atmosphere ambient to the chips that contains cadmium oxide vapor which is driven out at the sintering temperature from the cadmium silicate sintering flux in the chip bodies. Cadmium silicate compounds are not glass compositions and do not melt at the sintering temperature, as was pointed out by G. Maher in the patent U.S. Pat. No. 4,266,265. It is explained in the patent that the high temperature melting cadmium silicate flux reacts with other elements in the start powder mixture at the low sintering temperature of about 1100° C. whereby the composition of the flux is altered and the flux is thus rendered liquid at the sintering temperature. In the composition of the patent U.S. Pat. No. 4,266,265, the molten flux serves during sintering as a reservoir through which a further exchange of cations in the ceramic body and cations in the flux it self my take place.

But the start materials of the flux in U.S. Pat. No. 4,266,265 included lead which reacts at sintering with the flux and drops the melting temperature.

Other such elements that may render the flux molten are the low temperature glass formers boron and bismuth, and they are not either in the present invention. Therefore it is believed that, in the capacitors of the patent U.S. Pat. No. 5,258,338 and those of the present invention, there were no such elements to react with the cadmium silicate and cause it to melt, and the reactions during sintering between the elements of the start materials at sintering is effected only by solid state diffusion aided by the atmosphere of the very chemically active cadmium vapor in the closed crucible.

Thus in the start powders of this patent and in the present invention, no such elements are provided which in combination with the cadmium flux cause it to melt during sintering.

An additional reason for sintering in a closed crucible is that the escape of large amounts of cadmium oxide during firing would otherwise create a serious health hazard to those involved in manufacturing capacitors.

The above-noted anneal step was thus also seen as a necessity but has been found by further experience to be burdensome to capacitor manufacturers for several reasons. The post-sinter anneal step is an additional manufacturing step entails additional cost and is a last step in which lack of sufficient process control can ruin the nearly finished capacitors. It also results in an increase of from five to ten percent in the dielectric constant. It also unfortunately causes the dissipation factor (DF) to become a little higher and the temperature coefficient a little less smooth.

It is therefore an object of this invention to provide a low-firing dielectric powder composition including a cadmium silicate flux that may be sintered in a closed crucible without a subsequent anneal step, leading to a mature ceramic having a smooth X7R temperature characteristic, a high dielectric constant and having at high operating temperatures a high insulation resistance.

SUMMARY OF THE INVENTION

A method for making a ceramic powder mixture comprises preparing a mixture of start powders including at least ninety weight percent of essentially pure barium titanate powder having an average particle size of from 0.4 to 0.7 micron, from 1.5 to 2.5 weight percent of a cadmium silicate powder, and a powder additive consisting of from 0.89 to 2.72 mole percent of a reactivity-inhibitor cation and from 0.2 to 1.0 mole percent calcium cations both relative to the amount of the barium titanate.

The start-powders mixture is then mildly calcined at about 700° C. to obtain a powder comprised of agglomerates of the powder mixture wherein each of the agglomerates has essentially the same composition of barium titanate, cadmium silicate, reactivity-inhibitor and calcium as in the start powder mixture to provide a calcined powder mixture capable of being formed into a body that can be sintered by firing in a closed crucible at from 1000° C. to 1150° C. to produce a dielectric ceramic body capable of having a sustained high insulation resistance under high temperature operating conditions.

It is preferred that the calcium cations are introduced as a calcium compound selected from CaO, precursors of CaO, $CaNb_2O_7$ and combinations thereof. The powder additive preferably includes up to 0.2 mole percent manganese oxide relative to the barium titanate.

In another aspect of this invention a method for making an X7R high K multilayer ceramic capacitor body comprises forming a slurry by mixing in an organic vehicle a mixture of start powders consisting of at least ninety weight percent essentially pure barium titanate powder having an average particle size of from 0.4 to 0.7 micron, from 1.5 to 2.5 weight percent of a cadmium silicate powder, and with respect to the amount of barium titanate from 0.89 to 2.72 mole percent of a reactivity-inhibitor cation and from 0.2 to 1.0 mole percent calcium cations.

Layers of the slurry are prepared, dried, and stacked with interleaved patterned films of a palladium-silver ink between successive adjacent pairs of the layers. The ceramic capacitor body is sintered in a closed crucible at a temperature between 1120° C. to 1150° C., and without further heating or annealing produces a dense ceramic capacitor body with buried electrodes, so that the sintered ceramic of the body has a dielectric constant over temperature that meets the X7R standard of smoothness and has a an insulation resistance greater than 15 megohm-microfarads at 125° C. for 100 hours life test without having been annealed in an open atmosphere. It is preferred that the sintered ceramic body have a dielectric constant greater than 3800, and that the average size of the sintered ceramic grains in the body is within the range of from 0.5 to 1.2 microns.

In yet another aspect of this invention, an X7R multilayer ceramic capacitor includes a barium titanate body, two groups of interdigitated electrodes, composed of 30 weight percent palladium and 70 weight percent silver, buried in the body and extending respectively to ends of the body, and two conductive terminations contacting the two groups respectively at the body ends. The body is comprised of at least 90 weight percent of a barium titanate having grains of average size from 0.7 to 1.5 microns having been matured only by sintering in a closed crucible at from 1120° C. to 1150° C., and relative to the amount of the barium titanate from 1.5 to 2.5 weight percent of a cadmium silicate, from 0.89 to 2.72 mole percent of a reactivity-inhibitor cation, and from 0.2 to 1.0 mole percent of a calcium cation.

The use in multilayer ceramic capacitors of a cadmium silicate flux was first disclosed by Galeb Maher in his patent U.S. Pat. No. 4,266,265, issued May 5, 1981. Cadmium silicate flux, that does not melt at the temperature of sintering, has since become both better appreciated for its advantages. This invention however recognizes, that in ceramic compositions in which there occurs at sintering a reaction in which the flux incorporates an element, e.g. such as lead, bismuth or, zinc, which element drops the melting temperature of the flux to less than the sintering temperature, then the sintered body tends to be semiconducting which typically leads to a high failure rate under an accelerated life test of high voltage and high temperature.

This invention further recognizes that the source of this semiconductivity has been sintering in a closed crucible that provides an atmosphere of cadmium vapor which is essential to the ceramic densification process, but that compared to the more conventional open air sintering causes an oxygen deficiency in the sintering atmosphere which deficiency is severe enough to make the sintered parts semiconductive.

BRIEF DESCRIPTION OF THE DRAWINGS

FIG. 2 shows the performance data for a prior art composition and method for making multilayer capacitors including three sintering temperatures, which method requires a post-sinter annealing step to assure passing an insulation-resistance life test. These capacitors serve as controls against which the following data may be compared.

FIG. 3 shows the performance data for experimental multilayer capacitors with various kinds and amounts of reactivity inhibitor agents in the ceramic start powder compositions FIG. 4 shows the performance data for experimental multilayer capacitors wherein the palladium silver electrodes of the control capacitors of Table I are replaced by non-silver precious metals.

FIG. 5 shows the performance data for experimental multilayer capacitors wherein the $BaTiO_3$ powder of Table I is replaced by two nominally equivalent $BaTiO_3$ manufactured by a second and third party.

FIG. 6 shows the performance data for experimental multilayer capacitors wherein small amounts of titania is added to the start powder mixture of the capacitors of Table I.

FIG. 7 shows the performance data for experimental multilayer capacitors wherein small amounts of five rare earth oxides are added one at a time to the start powder mixture of the capacitors of Table I.

FIG. 8 shows the performance data for experimental multilayer capacitors wherein small amounts of calcium carbonate and magnesium carbonates are added one at a time to the start powder mixture of the capacitors of Table I.

FIG. 9 shows the performance data for experimental multilayer capacitors of this invention wherein small amounts of calcium niobate are added to the start powder mixture of the capacitors of Table I.

DESCRIPTION OF THE PREFERRED EMBODIMENTS

The problem of low insulation resistance before a post-sintering anneal was begun by asking by what mechanism this phenomena occurred. As noted in the patent U.S. Pat. No. 5,258,338 it was thought that free cadmium had been left in the grain boundaries of the sintered body which caused the low resistance path leading to degradation of the insulation resistances Also considered was that free silver coming from the palladium-silver buried electrodes may have found its way into the interstices between the grains during sintering.

Experiments were devised to test the verity of each of these two possible contributors to an unacceptably low resistivity of the ceramic body at high operating voltage and temperatures —The making of prior art controls—

First, three groups each of 36 multilayer capacitors, identified here as Examples 1, 2 and 3, were made using the above noted commercial powder and employing the same capacitor manufacturing method described in the patent which we had used to qualify this powder for sale. This group of capacitors were made as a control, or reference, to which experimental capacitors are subsequently compared herein. These prior art control capacitors are made as follows.

The principal start material is a pure barium titanate powder made by the hydrothermal process, the average particle size being 0.5 micron. The start powder mixture consists of a quantity of the barium titanate, 2 weight percent cadmium silicate glass of composition $5CdO \cdot 2SiO_2$, 1.2 weight percent of a reactivity inhibitor $Nb_2O_5$ and 0.1 weight percent $MnCO_3$ which has traditionally been used for helping to produce a high insulation resistance. These minor additives are taken as the stated in weight percent relative to the amount of barium titanate.

A slurry is formed by milling the above start powder mixture in an liquid organic vehicle. A layer of some of the slurry is spread onto a flat substrate and dried. A film of palladium-silver ink is screened in a pattern over the dry layer of ceramic slurry.

Additional layers of slurry and electroding paste are built up by either the curtain coating process, or by the tape process described hereinabove, so that ultimately metal ink film patterns are respectively deposited between successive adjacent pairs of the ceramic layers to create a stack of dried "green" ceramic layers with patterned electroding layers interspersed therebetween.

Figure 1:
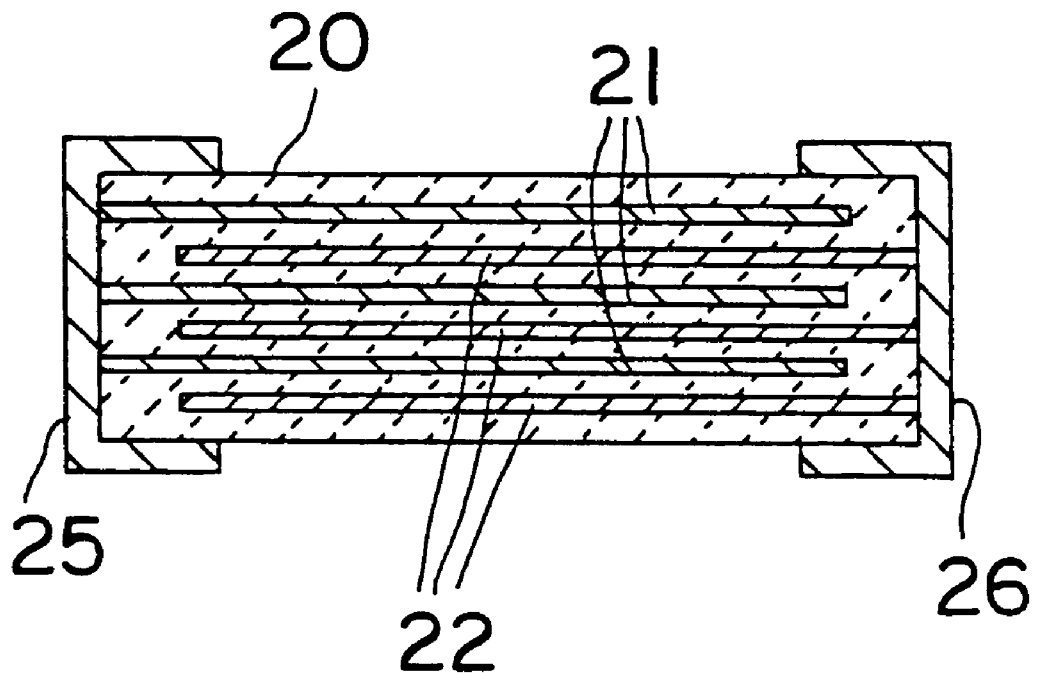
FIG. 1 shows in side sectional view a monolithic or multilayer ceramic capacitor (MLC) of this invention.

The body 20, as shown in FIG. 1 has ceramic layers 21 and buried electrodes 22 as cut from the stack. The stack is now a green ceramic chip that is heated to drive out the organic components and bisked to harden the green stacks as in the prior art process noted above. In each of the three groups of 36 chips, corresponding respectively to Examples 1, 2 and 3, the stacks/chips of a group are placed in a closed crucible and respectively sintered at 1090° C., 1110° C. and 1130° C.

Each group of 36 capacitors in Examples 1, 2 and 3 was divided into a first and second sub-group of 18 capacitor chips each.

The three first sub-groups of chips were terminated by applying a silver paste to either end of body 20 at which ends a set of alternate of the buried electrodes were exposed, and the body was heated at 750° C. for a few minutes to form silver terminations 25 and 26.

The thickness of each dielectric ceramic layer between adjacent buried electrodes was nominally from 16 to 18 microns thick.

After the capacitors were cooled to room temperature, the capacitance and the dissipation factor (DF) of each capacitors sub-group was measured, and then a life test was conducted by applying a 150 volts DC (amounting to 8.8 volts per micron of nominal dielectric thickness) while holding the temperature of the capacitors at 125° C.

A capacitor is deemed to have failed this life test if the insulation resistance of the capacitor falls below 15 megohm-microfarads before 100 hours. In the top half of the table in FIG. 2, data for the first sub-group capacitors of Example 1 after sintering, and no anneal, shows no failures after 24 hours and no failures after 159 hours at which time they were taken off of test. However, the capacitors of Examples 2 and 3 all failed within 24 hours.

As seen in the top half of the table in FIG. 2, the two first sub-groups (Examples 2 and 3) having been sintered at the two higher temperatures and not annealed, failed the life test. In Example 1 the chips sintered at the lowest temperature passed. This tendency for life test failures to result from higher sintering temperatures will also be seen evident in many of the other experiments presented herein. Causes for this trend will be discussed further later below.

The 18 capacitors of the second sub-groups in Examples 1, 2 and 3 were subjected to a post-sinter anneal at 1070° C. for about three hours. The three second sub-groups of chips were terminated by applying a silver paste to either end of body 20 at which ends a set of alternate of the buried electrodes were exposed, and the body was heated at 750° C. for a few minutes to form silver terminations. Measurements of dielectric constant, temperature coefficient of dielectric constant, and life test performance were made. The results are shown in the bottom half of the table in FIG. 2.

With respect to the annealed second sub-group in the table in FIG. 2, one out of the 18 capacitors of Example 1 after an anneal also still fails the life test, as do two of the capacitors of Example 3 after the anneal. These failures only occurred within the first 24 hours of the life test. Therefore it is believed that all of these failures were attributable to mechanical faults. In Examples 2–3 after anneal, the dielectric constant (K) is above 4000 and the TCC is well within the X7R limits of +/–15% over the temperature range of from –55° C. to 125° C. for all the capacitors.

The anneal is thus seen as having saved all of the capacitors of Examples 2 and 3.

Two more groups of 36 each of experimental capacitors, Examples 4 and 5, were made using the same start powder as for the control capacitors of Examples 1–3, except for the reactivity inhibitor additives. With reference to the table in FIG. 3, in Example 4, 0.8 weight percent (0.42 mole %) niobia plus 0.8 weight percent tantalum oxide (0.7 mole %) was included as the inhibitor in the mixture, whereas the inhibitor additive in example 5 is simply 2 weight percent (1.06 mole %) tantalum oxide. The amounts of inhibitor respectively in these two examples are equal molar quantities. After sintering in a closed crucible, all capacitors failed and after anneal all capacitors passed the life test.

But, the point of these two groups of experimental capacitors is that niobium and tantalum as the inhibitor have essentially identical effect upon the dielectric constant, DF and the temperature coefficient.

Note that in the table in FIG. 3 and the following tables, density measurements were not made for both before-annealed capacitors and after-annealed capacitors of the same composition because experience has shown that the density is essentially unchanged by annealing. The term "N.A." indicates that the data is not available.

Referring the table in FIG. 4, experimental capacitors of Examples 6 and 7, are the same as the controls except the palladium-silver electrodes were replaced by precious metal electrodes that exclude silver. The performance of these capacitors both before and after annealing is similar to the before and after performance of the controls (in Examples 1, 2 and 3. It is clear from this data that free silver is not the cause of poor life test results before annealing.

Referring to the table in FIG. 5, experimental capacitors of Examples 8 and 9, respectively, were made with 0.5 micron average particle size $BaTiO_3$ from two different suppliers than the supplier of the $BaTiO_3$ used in the control capacitors, Examples 1–3. We had made these experiments several years ago for the purpose of identifying, among the expensive fine powder $BaTiO_3$ powders available, which provided the best balance between performance and cost.

The capacitors Example 8 performed about the same way as the control capacitors of Example 3, both before annealing and after annealing. However the capacitors of Example 9 had a much lower failure rate at life test than the controls of Example 3, which led to the suspicion that the start barium titanate included impurities.

This unexpected result brought to mind the former use additives that tended to prevent semiconductivity in barium titanate ceramics fired in a reducing atmosphere, e.g. experimental barium titanate ceramics with base-metal electrodes that are fired in nitrogen to prevent oxidation of the base metal.

Various suppositions and experiments of this kind used additions such as non-stoichiometric amounts of small cations such as Ti, or aleovalent cations such as niobium and the rare earths, or cations of size intermediate that of barium and titanium such as magnesium and calcium.

Experimental capacitors of Examples 10, 11, 12 and 13 were made wherein small amounts of excess titania were added; the corresponding data is shown in the table in FIG. 6. Compared to the control capacitors of Example 2, the excess titania in capacitors of Examples 10 and 11 definitely improves the life test results before anneal, and annealing at two different temperatures of Example 10 compared to Example 11 has little effect compared to the before annealing failure rate. Results in this experiment seem to be consistent with the semiconductivity theory.

In a next series of experiments, Examples 14–25, for which data is shown in the table in FIG. 7, various rare earth oxide additions were incorporated in these capacitors that were otherwise made as were the control multilayer capacitors of Examples 1–3.

The yttrium oxide additions of Examples 14, 15, 16 and 17 were only helpful but not completely successful in abating the life-test failure rate before anneal for capacitors sintered at 1110° C. (Examples 14 and 16) but not those (of Examples 15 and 17) sintered at a higher temperature. Also, annealing of these capacitors did not effect the same assurance that the failure rate would be zero as in the controls.

Erbium oxide additions of Examples 18 and 19, and the ytterbium additions of Examples 20 and 21 followed the same pattern as for yttrium. This pattern was repeated, but less clearly, for the dysprosium additions of Examples 22 and 23, and for the gadolinium additions of Examples 24 and 25.

The additions of rare earth oxides in the capacitors of the table in FIG. 7 are not sufficiently effective to permit the abandonment of annealing.

Experimental capacitors of Examples 26 through 37 were made wherein small dopant amounts of calcium carbonate and magnesium carbonate were added; the corresponding data is shown in the table in FIG. 8.

With 0.44 mole % of a calcium compound selected from CaO and precursors thereof relative to the amount of $BaTiO_3$ is added as in Examples 26, 27 and 28, improvement is effected in life test performance before anneal when sintering at 1110° C. in Example 26. When the same formulation is sintered at 1130° C., the unannealed capacitors in Example 27 all pass the life test, the dielectric constant K is highest at 4206, and the coefficient of K with temperature is a very smooth X7R. But when the sintering temperature is increased to 1140° C., a large percentage fail the life test before anneal.

In Examples 29, 30 and 31 the amount of calcium carbonate is increased to 0.52 mole % relative to the amount of $BaTiO_3$ and the performance is excellent for the capacitors of Examples 32 and 30 that were sintered respectively at 1130° C. and 1140° C. But at a sintering temperature of 1150° C. many capacitors of Example 31 failed before anneal.

A further increase was made in the amount of calcium carbonate to 0.65 mole % relative to the amount of $BaTiO_3$ in the capacitors of Examples 32, 33 and 34. This resulted in no life test failures for capacitors in Examples 32 and 33 that were fired at 1130° C. and 1140° C. respectively, although the dielectric constant was lower than that of Example 29.

It is also noteworthy that the dielectric constant K increases by about 5% after an anneal that would no longer be necessary for instance in Examples 26, 27, 29, 30, 32, 33 and 34 for achieving zero failures at life test. From the calcium dopant data in the table in FIG. 8, the amount of calcium cation in the start powder mixture that is expected to be effective ranges from about 0.2 to 1.0 mole percent. Neither does the anneal result in these cases in a much less smooth coefficient of K with temperature, which is evident in the data of the table in FIG. 8. Anneal in these cases is relegated as an option to a capacitor manufacturer who requires in some situations a little higher dielectric constants Referring to the table in FIG. 9, to demonstrate that calcium can be introduced in other forms, experimental capacitors of Example 38 were made wherein calcium cations were introduced as $CaNb_2O_7$ in the amount 0.65 mole percents. Since this resulted in about half the desired niobium (the amount of niobium cations in Examples 1, 2 and 3), this difference was made up by adding 0.4 mole percent niobia. All of the capacitors of Example 38 pass the life test. Temperature coefficient of capacitance (TCC) is a little smoother and the dielectric constant (K) is a little lower. The annealed capacitors show similar properties.

It is now believed that instead of removing free cadmium from the sintered body to prevent failures, the post-sintering anneal simply provided oxygen to eradicate the oxygen vacancies in the grain cores.

The grain-growth inhibiter in this method for making an X7R ceramic is believed to superficially react only with the surface of the barium titanate grains to inhibit further reactivity and to limit grain growth. Thus in the resulting ceramic body, the ceramic grains are each believed to have an outer shell containing grain growth inhibitor and an inner core containing essentially no niobium Note that from the table in FIG. 8 the effective amount of reactivity-inhibitor in the start powder mixture ranges from about 0.5 to 1.5 weight percent niobia relative to the barium titanate, which corresponds to from 0.89 to 2.72 mole percent of the niobium cations, $Nb^{+5}$.

It is believed that during sintering, incorporation of some of some of the niobium into the grain results in free electrons. These free electrons increase the conductivity and cause life test failures. It transforms the ceramic into a semiconductors.

Upon annealing in air, the ceramic is restored to a highly resistive dielectric. This restoration is believed accomplished by the following process.

The grains are assumed to have oxygen vacancies after sintering. During a subsequent annealing in an open atmosphere, oxygen is incorporated into the grains and free electrons therein are consumed. The consumption of free electrons can even occur during sintering of the number of oxygen vacancies is high, as in the case of Example 9. The number of oxygen vacancies is a function of temperature, oxygen pressure, and amount of acceptor dopants. At lower temperatures and higher oxygen pressure, the number of oxygen vacancies are mostly determined by numbers of acceptor dopants.

The role of calcium (or magnesium) in raising insulation resistance of the ceramic and improving life test results may be because some of the incorporated calcium occupies both titanium and barium sites in the crystal lattice. Calcium in a titanium site is an acceptor and results in oxygen vacancies.

However, when Nb and Ca are being incorporated in the Ti sites, neither vacancies nor free electrons are released. For this to happen, exactly one Ca cation should be present on a Ti site for every two Nb cations on a Ti site. If there are more Ca cations, then oxygen vacancies are released which do not have as dramatic an influence on life test performances See the paper by H. M. Chan et al, entitled COMPENSATING DEFECTS IN HIGHLY DONOR-DOPED $BaTiO_3$, Journal of the American Chemical Society, vol. 69, no. 6, pages 507–510, 1986.

Note that in the data of Examples 26 through 34 in the table in FIG. 8, at higher sintering temperatures, more and more Nb cations can be incorporated requiring more and more Ca cations.

Figure 10:
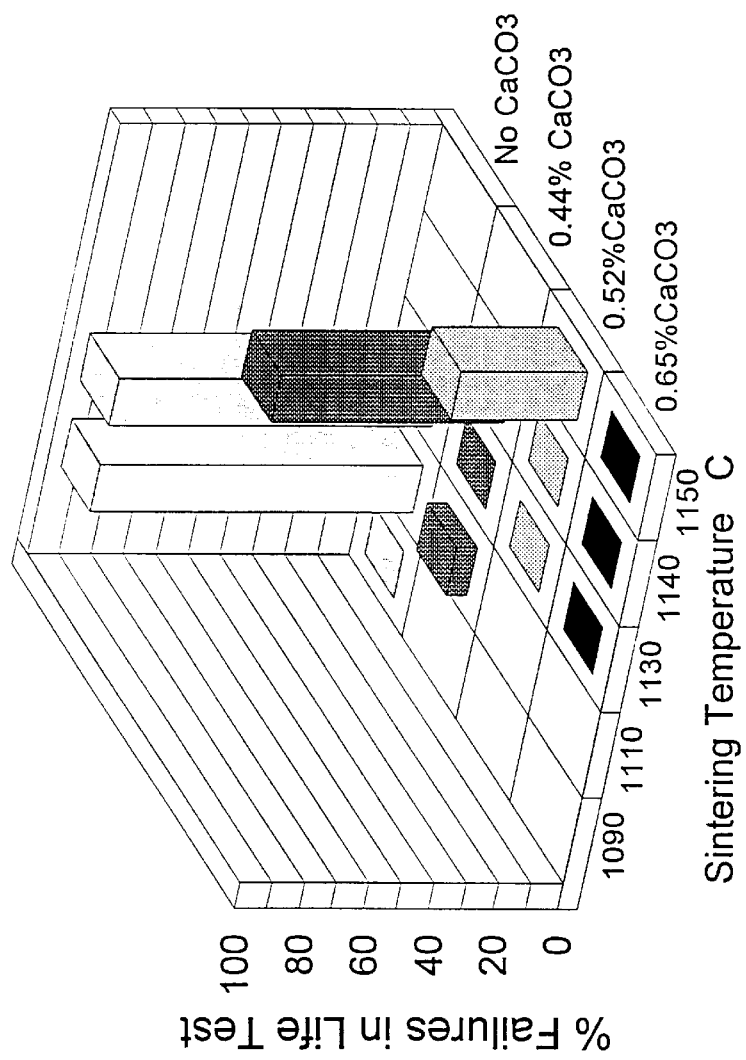
FIG. 10 shows a three dimensional bar graph representing percentage of life-test failures as a function of the sintering temperature and amounts of calcium in capacitors(s) of this invention.

The three dimensional bar graph of FIG. 10 presents the percentage of failures at life-test for multilayer capacitors of this invention (Examples 26–34) as a function of the temperature at which they were sintered, for three different amounts of calcium in the dielectric ceramic.

The Examples 35, 36 and 37 in the table in FIG. 8 show data of experimental multilayer capacitors in which there have been added 0.44 mole percent of a magnesium dopant, $MgCO_3$, relative to the amount of $BaTiO_3$. This resulted for each of the three groups of capacitors in great improvement in life test results for sintering temperatures ranging from 1130° C. to 1150° C., but is not as effective as is the calcium dopant.

Thus, magnesium may be incorporated in the barium titanate in place of a calcium additive to improve insulation resistance as in Examples 35, 36 and 37. However, whereas it is known that only part of incorporated Ca cations are on the Ti sites, all of the smaller Mg cations are expected to be incorporated on Ti sites. It is thus expected that substituting about half the molar amount of magnesium dopant cations as for the calcium dopant cations, will yield the same results, i.e. the life-tests failure rate relationship to the sintering temperature.

We claim:

1. A method for making a ceramic powder mixture comprising:
   a) preparing a mixture of start powders comprising at least ninety weight percent essentially pure barium titanate powder having an average particle size of from 0.4 to 0.7 micron, from 1.5 to 2.5 weight percent of a cadmium silicate powder, and a powder additive consisting of from 0.89 to 2.72 mole percent of a reactivity-inhibitor cation and from 0.2 to 1.0 mole percent calcium cations both relative to the amount of said barium titanate; and
   b) mildly calcining said start powder mixture at approximately 700° C. to obtain a powder comprised of agglomerates of said powder mixture wherein each of said agglomerates has essentially the same composition of barium titanate, cadmium silicate, reactivity-inhibitor and calcium as in said start powder mixture to provide a calcined powder mixture capable of being formed into a body that is sintered by firing in a closed crucible at from 1120° C. to 1150° C. to produce a dielectric ceramic body having a sustained high insulation resistance under high temperature operating conditions.

2. The method of claim 1 wherein said calcium cations are contained in said powder additive as a calcium compound selected from CaO, precursors of CaO, $CaNb_2O_7$ and combinations thereof.

3. The method of claim 1 wherein said cadmium silicate is $5CdO \cdot 2SiO_2$.

4. The method of claim 1 wherein said powder additive further includes up to 0.2 mole percent manganese oxide relative to said barium titanate.

5. A method for making an X7R high K multilayer ceramic capacitor body comprising:
   a) forming a slurry by mixing in an organic vehicle a mixture of start powders consisting of at least ninety weight percent essentially pure barium titanate powder having an average particle size of from 0.4 to 0.7 micron, from 1.5 to 2.5 weight percent of a cadmium silicate powder, and with respect to the amount of barium titanate from 0.89 to 2.72 mole percent of a reactivity-inhibitor cation and from 0.2 to 1.0 mole percent calcium cations;
   b) preparing layers of said slurry, drying the layers, forming a stack of said layers and interleaving patterned films of a palladium-silver ink between successive adjacent pairs of said layers; and
   c) heating to mature said ceramic capacitor body, by sintering without post-sinter anneal, in a closed crucible at a temperature between 1120° C. to 1150° C. to produce a dense ceramic capacitor body with buried electrodes,
   so that the sintered ceramic of said body has a dielectric constant over temperature that meets the X7R standard of smoothness and has a an insulation resistance greater than 15 megohm-microfarads at 125° C. for 100 hours life test without having been annealed in an open atmosphere.

6. The method of claim 5 wherein after said sintering the sintered ceramic of said body has a dielectric constant greater than 3800.

7. The method of claim 5 wherein said cadmium silicate is $5CdO \cdot 2SiO_2$.

8. The method of claim 5 wherein the average size of the sintered ceramic grains in said body is within the range of from 0.5 to 1.2 microns.

9. An X7R multilayer ceramic capacitor comprised of a barium titanate body, two groups of interdigitated electrodes, composed of 30 weight percent palladium and 70 weight percent silver, buried in said body and extending respectively to ends of said body, and two conductive terminations contacting said two groups respectively at said body ends, said body being comprised of
   at least 90 weight percent of a barium titanate having grains of average size from 0.7 to 1.5 microns having been matured only by sintering in a closed crucible at from 1120° C. to 1150° C., and relative to the amount of said barium titanate from 1.5 to 2.5 weight percent of a cadmium silicate, from 0.89 to 2.72 mole percent of a reactivity-inhibitor cation, and from 0.2 to 1.0 mole percent of a calcium cation.

10. The multilayer ceramic capacitor of claim 9 wherein the sintered ceramic of said body has a dielectric constant greater than 3800.

11. The multilayer ceramic capacitor of claim 9 wherein said cadmium silicate is selected from $5CdO \cdot 2SiO_2$.

12. The multilayer ceramic capacitor of claim 9 wherein the average size of the sintered ceramic grains in said body is within the range of from 0.5 to 1.2 microns.

* * * * *